United States Patent
Wang et al.

(10) Patent No.: US 7,054,670 B2
(45) Date of Patent: May 30, 2006

(54) CELLULAR PHONE STRUCTURE AND PORTABLE ELECTRONIC APPARATUS

(75) Inventors: Chien-Jui Wang, Taipei (TW); Chun-Hsiung Yin, Tainan (TW); Chih-Wei Wu, Taipei (TW)

(73) Assignee: BENQ Corporation, Taoyuan (TW)

( * ) Notice: Subject to any disclaimer, the term of this patent is extended or adjusted under 35 U.S.C. 154(b) by 253 days.

(21) Appl. No.: 10/752,979

(22) Filed: Jan. 7, 2004

(65) Prior Publication Data

US 2005/0059425 A1 Mar. 17, 2005

(30) Foreign Application Priority Data

Sep. 12, 2003 (TW) .............................. 92216437 U

(51) Int. Cl.
*H04B 1/38* (2006.01)

(52) U.S. Cl. ...................... 455/566; 455/572; 455/567; 340/407.1

(58) Field of Classification Search ................ 455/566, 455/344, 567; 439/500; 345/555; 361/686; 340/407.1

See application file for complete search history.

(56) References Cited

U.S. PATENT DOCUMENTS

| 6,179,649 B1 * | 1/2001 | An .............................. 439/500 |
| 6,226,176 B1 * | 5/2001 | Horie et al. ................ 361/686 |
| 6,600,937 B1 * | 7/2003 | Horngren .................... 455/567 |
| 2001/0049296 A1 * | 12/2001 | Lee et al. ................... 455/566 |
| 2003/0125008 A1 * | 7/2003 | Shimamura ................. 455/344 |
| 2004/0150647 A1 * | 8/2004 | Aleksic et al. .............. 345/555 |

* cited by examiner

*Primary Examiner*—Jean Gelin
*Assistant Examiner*—Phuoc Doan
(74) *Attorney, Agent, or Firm*—Quintero Law Office

(57) ABSTRACT

A cellular phone structure. The cellular phone structure includes a main body, an LCD touch panel, a power cell and a power cell cover. The main body has a first surface and a second surface opposite thereto. The LCD touch panel is disposed on the first surface. The power cell is disposed on the second surface and electrically connected to the main body. The power cell cover is disposed on the power cell and connected to the main body. The power cell cover has an operating interface module disposed therein.

11 Claims, 5 Drawing Sheets

CELLULAR PHONE STRUCTURE AND PORTABLE ELECTRONIC APPARATUS

BACKGROUND OF THE INVENTION

1. Field of the Invention

The present invention relates to a cellular phone structure, and in particular to a cellular phone structure that fully utilizes the interior space of the cell cover thereof.

2. Description of the Related Art

Conventional cellular phones often combine communication, digital photography, and video game function, or communication, PDA, and video game function. None, however, combine all. Furthermore, because the aforementioned functions are often poorly deployed in conventional cellular phones, it is often inconvenient to utilize one or more thereof.

SUMMARY OF THE INVENTION

Accordingly, an object of the invention is to provide a cellular phone structure providing communication, digital photography, PDA, and video game functions, fully utilizing the space thereof such that multiple functions are more efficiently provided. Specifically, the cellular phone structure utilizes fully the space provided by the power cell cover thereof, such that communication, digital photography, PDA, and video game functions can be simultaneously provided therein. The present cellular phone structure also provides reduced weight and ergonomic shape, such that more comfortable use of the cellular phone is enabled. The cellular phone structure comprises a main body, an LCD touch panel, a power cell and a power cell cover therefor. The main body has a first surface and a second surface opposite thereto. The LCD touch panel is disposed on the first surface. The power cell is disposed on the second surface and electrically connected to the main body. The power cell cover is disposed on the power cell and connected to the main body. The power cell cover has an operating interface module disposed therein.

The cellular phone structure further comprises a shaft rotatably disposed on the main body. The shaft has a camera lens and a speaker opposite thereto, both electrically connected to the main body via the shaft.

The main body further comprises a shutter button.

The first surface further comprises a first operating button and a second operating button disposed thereon, and the LCD touch panel is disposed between the first operating button and the second operating button.

The second surface further comprises a recess formed thereon, with the power cell disposed therein, and the power cell cover slidably connected to the main body.

The power cell cover further comprises a connector with the main body further comprising a connecting socket with the connector connected thereto, such that the power cell cover is electrically connected to the main body.

The power cell cover further comprises an upper cover and a lower cover, with the operating interface module disposed therebetween.

The operating interface module further comprises a circuit board, a key assembly and a display. The key assembly is disposed on the circuit board, and the display is connected to the circuit board.

The key assembly further comprises a plurality of keys and the circuit board further comprises a plurality of key switches corresponding thereto.

The upper cover further comprises a plurality of key holes and a display port, such that keys correspond to the key holes protrude therethrough. The display corresponds to the display port and is viewable therethrough.

The display is connected to the circuit board via a flexible flat cable (FFC).

The display is connected to the circuit board via a plurality of surface-mounted connectors.

Another object of the invention is to provide a portable electronic apparatus. The portable electronic apparatus comprises a main circuit module, a main body, a main circuit connecting portion, a power cell connecting portion, a power cell and an operating interface module. The main body covers the main circuit module and has a receiving space on the surface thereof. The main circuit connecting portion is disposed on the main body and is electrically coupled to the main circuit module. The power cell connecting portion is disposed on the main body and is electrically coupled to the main circuit module. The power cell is detachably disposed in the receiving space and supplies power to the main circuit module via the power cell connecting portion. The operating interface module is movably disposed on the main body and is selectively positioned in one of a first and a second position. The operating interface module covers the receiving space and is connected to the main circuit connecting portion to electrically connect the main circuit module when the operating interface module is positioned in the first position. The power cell is capable to be removed from the receiving space and the operating interface module is separated from the main circuit connecting portion when the operating interface module is positioned in the second position.

The operating interface module further comprises a keypad module and a display. The keypad module provides input data to the main circuit module via the main circuit connecting portion. The main circuit module transmits output data to the display via the main circuit connecting portion.

The keypad module further comprises a key assembly and a circuit board. The circuit board has a plurality of key switches and a monitor connecting portion. The key switches are activated by means of the key assembly. The display is electrically connected to the monitor connecting portion.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
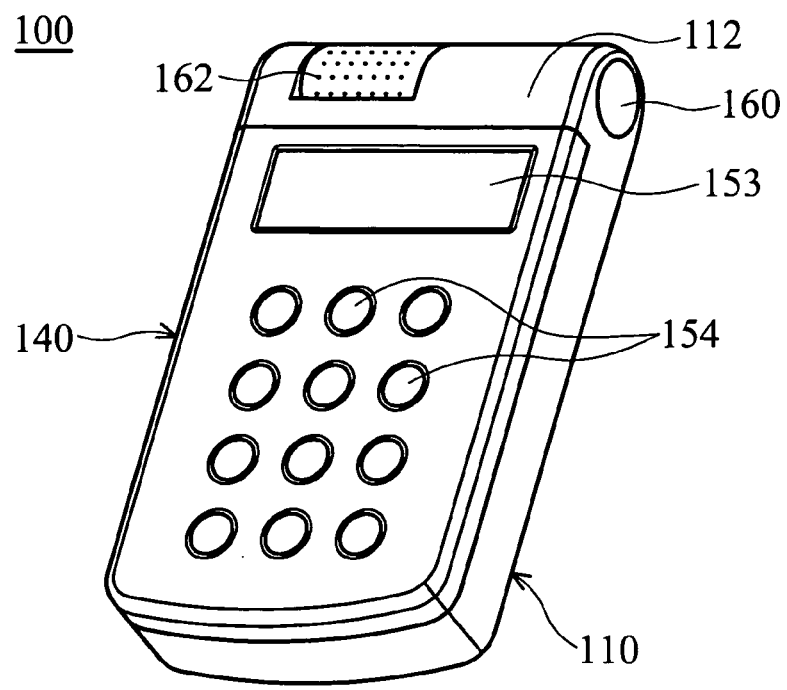
FIG. 1A is a perspective view showing the cellular phone structure of the invention.
Figure 1B:
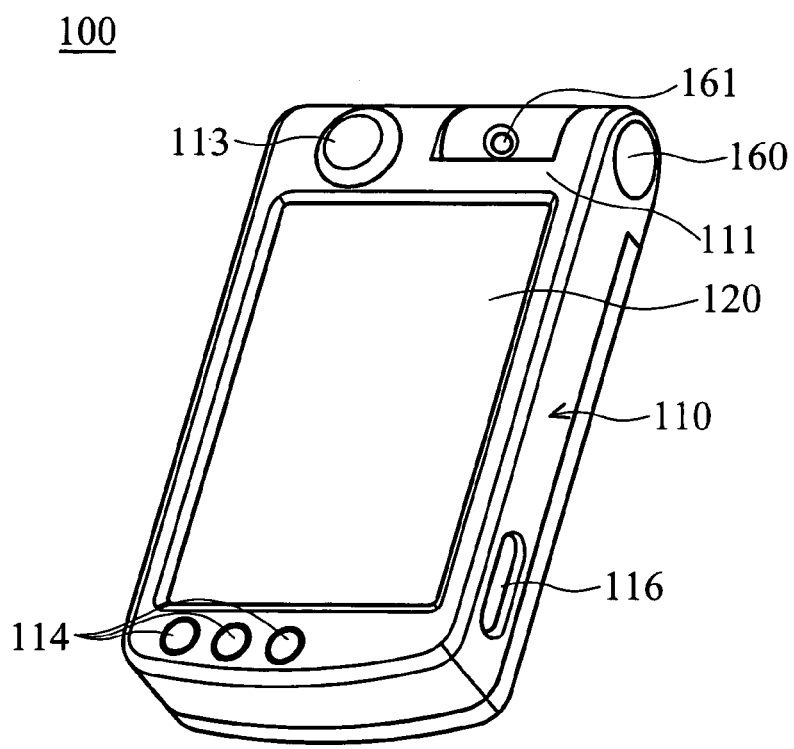
FIG. 1B is another perspective view showing the cellular phone structure of the invention.

Referring to FIGS. 1A, 1B, 1C, 1D and 2, the cellular phone structure 100 comprises a main body 110, an LCD touch panel 120, a power cell 130 and a power cell cover 140.

Figure 2:
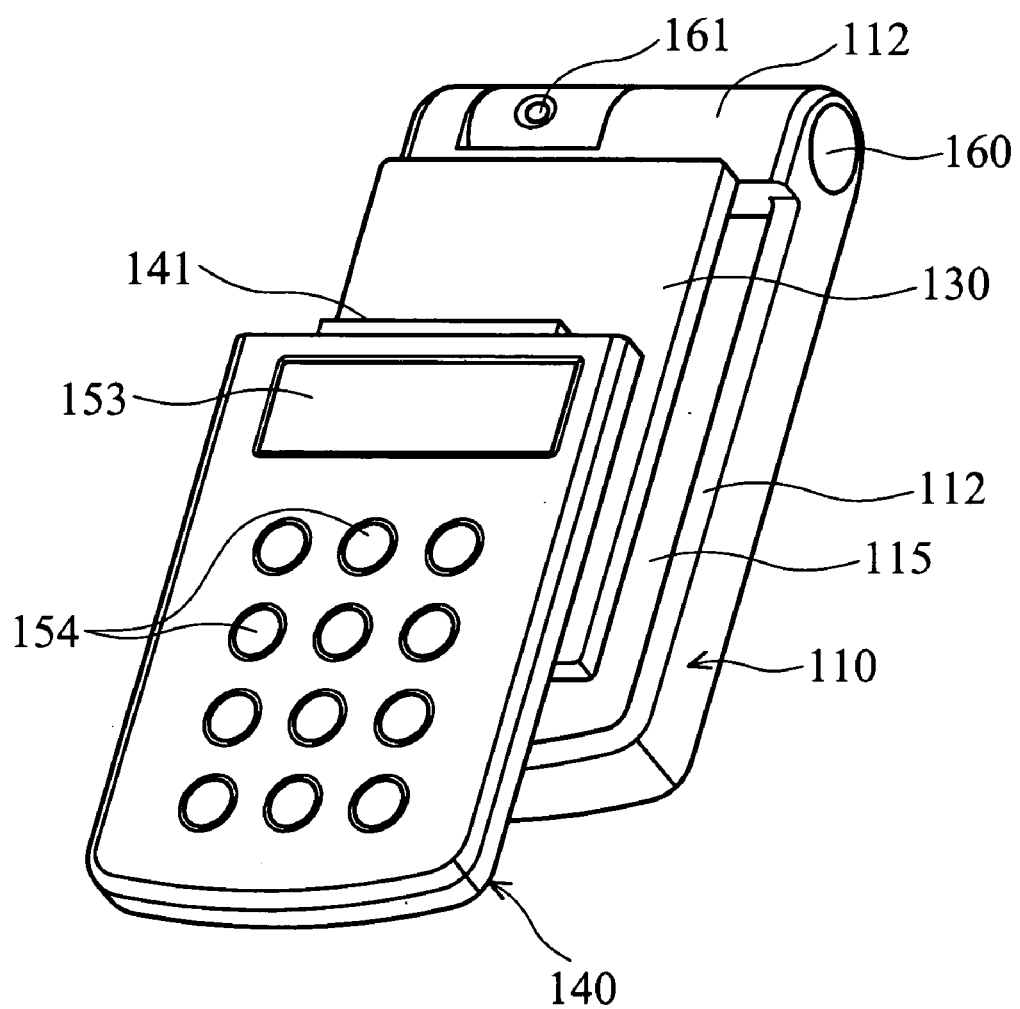
FIG. 2 is an exploded perspective view showing the cellular phone structure of the invention.

The main body 110 has a first surface 111 and a second surface 112 opposite thereto. In addition, a first operating button 113 and three second operating buttons 114 are disposed on the first surface 111. Specifically, a recess (receiving space) 115 is formed on the second surface 112, as shown in FIG. 2. Moreover, a main circuit module (not shown) is disposed in the main body 110, and a shutter button 116 is disposed on the main body 110.

The LCD touch panel 120 is disposed on the first surface 111 of the main body 110 and between the first operating button 113 and the second operating buttons 114.

The power cell 130 is detachably disposed in the recess 115 of the second surface 112 of the main body 110 and electrically connected to the main body 110. Specifically, a power cell connecting portion (not shown) is disposed on the recess 115. The power cell 130 is electrically connected to the main body 110 and supplies power to the main circuit module via the power cell connecting portion.

Figure 3:
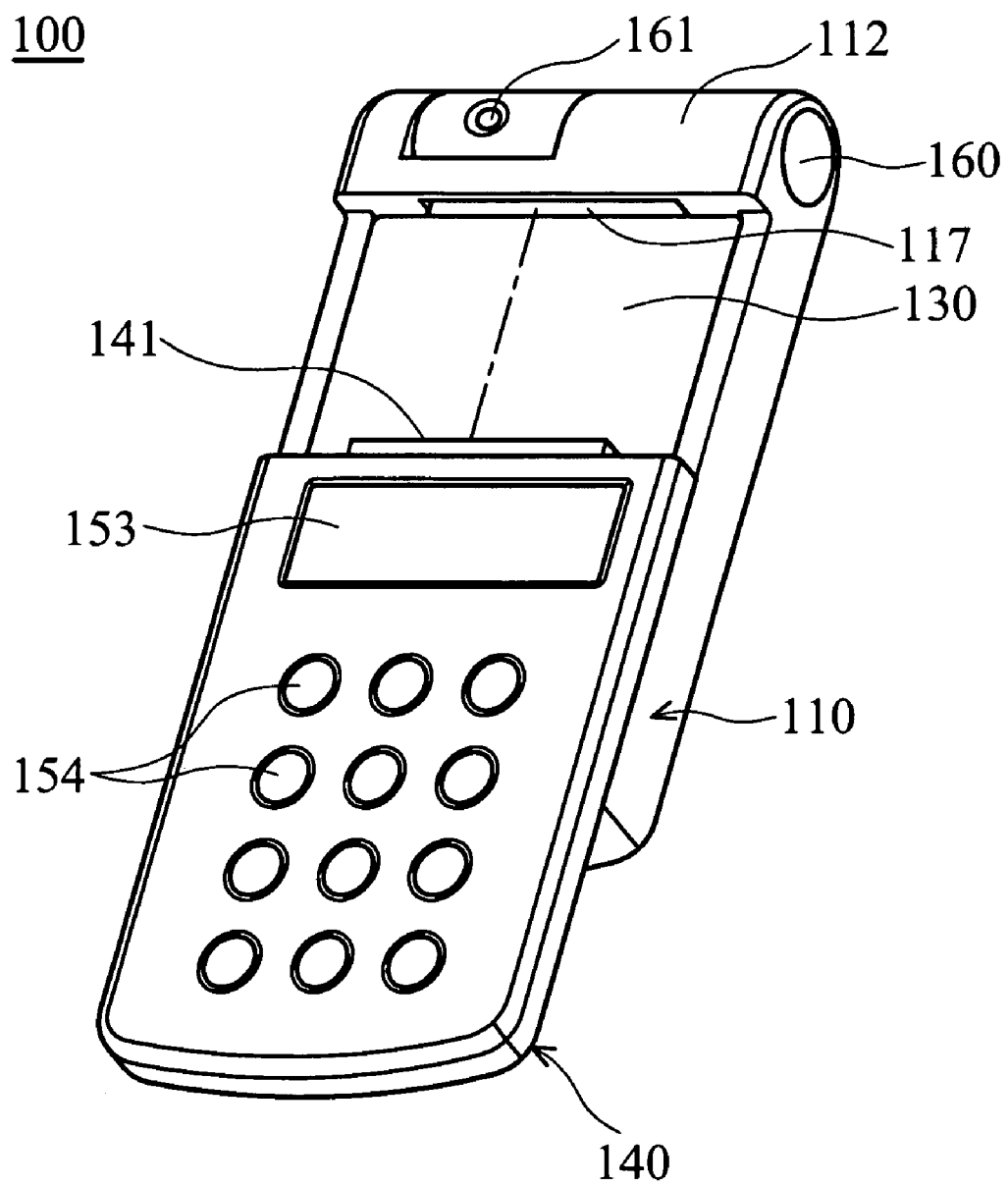
FIG. 3 is a perspective view showing the power cell cover separated from the main body of the cellular phone structure of the invention.

Referring to FIG. 3, the power cell cover 140 is detachably connected to the main body 110 and disposed on the power cell 130. Specifically, the power cell cover 140 is selectively positioned in one of a first position (as shown in FIG. 1A) and a second position (as shown in FIG. 3). Accordingly, when the power cell cover 140 is positioned in the first position, the power cell cover 140 covers a part of the recess (receiving space) 115. When the power cell cover 140 is positioned in the second position, the power cell 130 is capable to be removed from the recess (receiving space) 115. The power cell cover 140 has a connector 141 and the main body 110 has a connecting socket (main circuit connecting portion) 117. The connector 141 is connected to the connecting socket 117 such that the power cell cover 140 is electrically connected to the main body 110. Additionally, the connecting socket 117 and power cell connecting portion are electrically coupled to the main circuit module.

Figure 4:
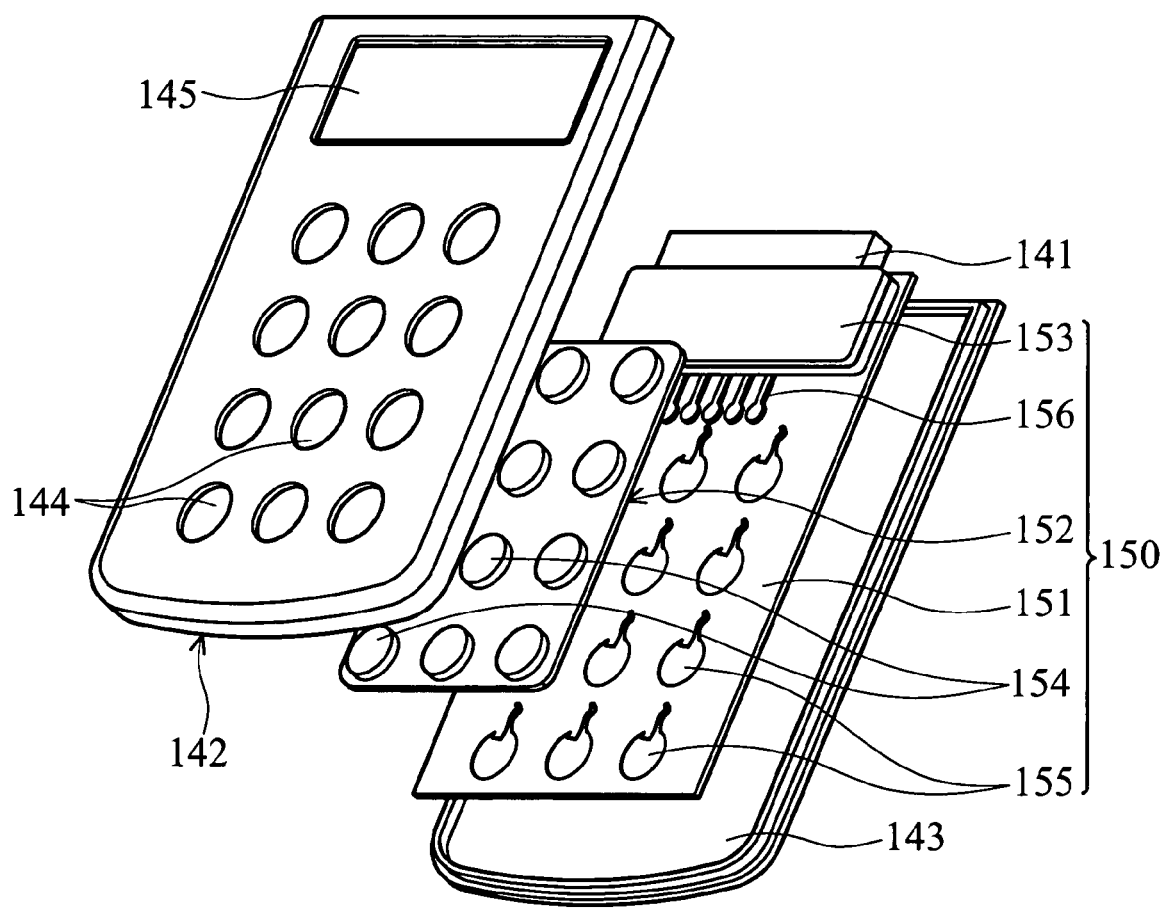
FIG. 4 is an exploded perspective view showing the power cell cover of the cellular phone structure of the invention.

Referring to FIG. 4, the power cell cover 140 has an upper cover 142 and a lower cover 143. An operating interface module 150 is disposed in the power cell cover 140. The operating interface module 150 is disposed between the upper cover 142 and the lower cover 143 and covered by the upper cover 142 and lower cover 143. Moreover, a plurality of key holes 144 and a display port 145 are formed on the upper cover 142. When the power cell cover 140 is positioned in the first position, the power cell cover 140 covers a part of the recess (receiving space) 115 and the operating interface module 150 is connected to the connecting socket (main circuit connecting portion) 117 to electrically connect the main circuit module. When the power cell cover 140 is positioned in the second position, the power cell 130 can be removed from the recess (receiving space) 115 and the operating interface module 150 is thereby separated from the connecting socket (main circuit connecting portion) 117.

As shown in FIG. 4, the operating interface module 150 has a circuit board 151, a key assembly 152 and a display 153. The circuit board 151 and key assembly 152 also refer to a keypad module. The key assembly 152 is disposed on the circuit board 151, and the display 153 is connected to the circuit board 151. Additionally, a plurality of keys 154 is disposed on the key assembly 152, and a plurality of key switches 155 is disposed on the circuit board 151. The keys 154 are respectively disposed on the key switches 155. The keys 154 correspond to both the key switches 155 and the key holes 144 of the upper cover 142. The display 153 is connected to the circuit board 151 via a flexible flat cable (FFC) or a plurality of surface-mounted connectors (monitor connecting portions) 156. Similarly, the position of the display 153 corresponds to that of the display port 145 of the upper cover 142. Thus, the display 153 is disposed in the display port 145 and extends therethrough. Accordingly, the keypad module (circuit board 151 and key assembly 152) provides input data to the main circuit module via the connecting socket 117 (main circuit connecting portion), and the main circuit module transmits output data to the display 153 via the main circuit connecting portion 117 (main circuit connecting portion). Thus, signal and power transmission between the power cell cover 140 and main body 110 are achieved via the connector 141 and main circuit connecting portion 117 (main circuit connecting portion).

Additionally, the cellular phone structure 100 has a shaft 160 rotatably disposed on the main body 110 with a camera lens 161 and a speaker 162 disposed thereon, with the camera lens 161 opposite to the speaker 162, or separated therefrom by 180°. The camera lens 161 and speaker 162 can be freely rotated. The camera lens 161 and speaker 162 are electrically connected to the main circuit module of the main body 110 via the shaft 160.

The following description explains the operation and function of the cellular phone structure 100 of the invention.

As shown in FIGS. 1A, 1B, 1C and 1D, a user can use the keys 154 on the power cell cover 140, display 153 and speaker 162 to perform normal telephone communication functions. For example, by pressing the keys 154 on the power cell cover 140 to place a phone call or receive an incoming phone call.

To perform digital photography, the camera lens 161 is aimed at an object and the shutter button 116 is pressed, with the captured image displayed on the LCD touch panel. The camera lens 161 can be freely rotated a position such as that shown in FIG. 1B, allowing image capture from any angle.

When the cellular phone structure 100 serves as a PDA, data is input to the cellular phone structure 100 or output via the LCD touch panel 120.

Figure 1C:
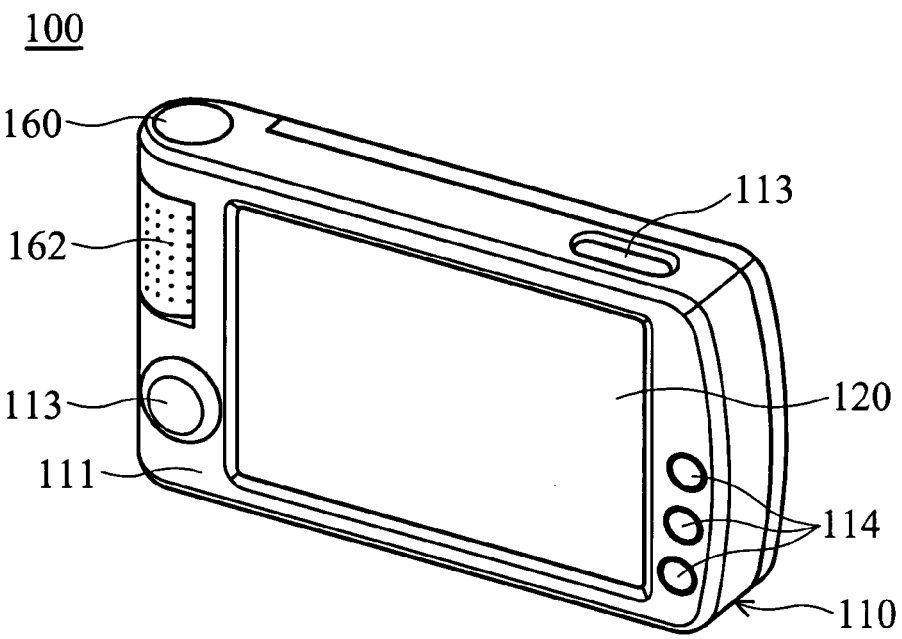
FIG. 1C is another perspective view showing the cellular phone structure of the invention.
Figure 1D:
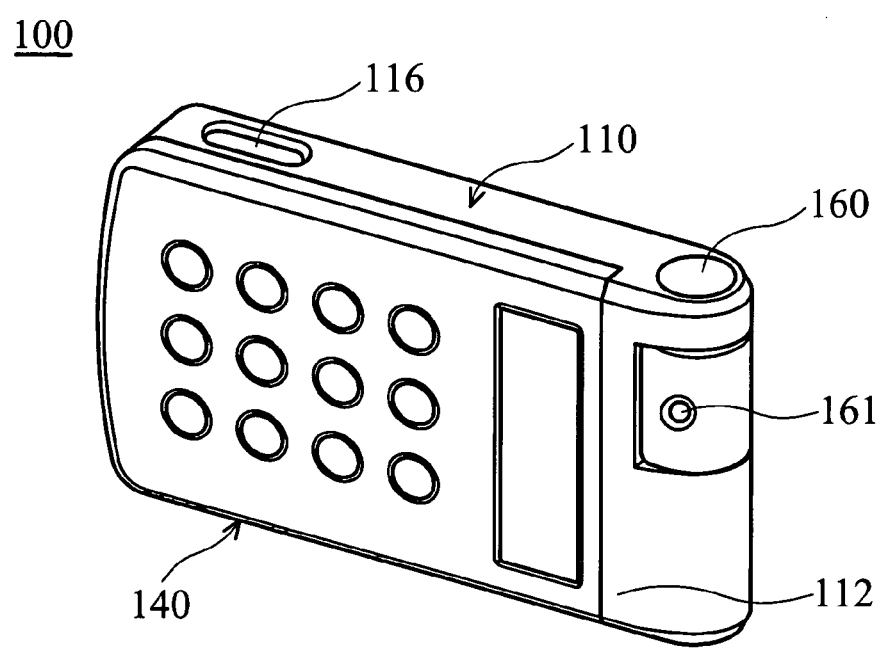
FIG. 1D is another perspective view showing the cellular phone structure of the invention.

When the cellular phone structure 100 serves as a video game player, the LCD touch panel 120 displays video game data, operated via the first operating button 113 and second operating buttons, as shown in FIG. 1C. Because the first operating button 113 and second operating buttons 114 are independent of the keys 154 on the power cell cover 140, function of the keys 154 is unaffected.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic apparatus, comprising:
   a main circuit module;
   a main body covering the main circuit module and having
      a receiving space formed on the surface thereof;

a main circuit connecting portion disposed on the main body and electrically coupled to the main circuit module;

a power cell connecting portion disposed on the main body and electrically coupled to the main circuit module;

a power cell detachably disposed in the receiving space and supplying power to the main circuit module via the power cell connecting portion; and an operating interface module movably disposed on the main body and selectively positioned in one of a first and a second position, wherein the operating interface module covers the receiving space and is connected to the main circuit connecting portion to electrically connect the main circuit module when the operating interface module is positioned in the first position, and the power cell is capable to be removed from the receiving space and the operating interface module is separated from the main circuit connecting portion when the operating interface module is positioned in the second position.

2. The portable electronic apparatus as claimed in claim 1, wherein the operating interface module further comprises a keypad module and a display, the keypad module providing input data to the main circuit module via the main circuit connecting portion, and the main circuit module providing output data to the display via the main circuit connecting portion.

3. The portable electronic apparatus as claimed in claim 2, wherein the keypad module further comprises a key assembly and a circuit board having a plurality of key switches and a monitor connecting portion, the key switches activated by means of the key assembly, and the display electrically connected to the monitor connecting portion.

4. The portable electronic apparatus as claimed in claim 1, further comprising a shaft rotatably disposed on the main body, comprising a camera lens and a speaker opposite thereto, both electrically connected to the main body via the shaft.

5. The portable electronic apparatus as claimed in claim 1, wherein the main body further comprises a shutter button.

6. The portable electronic apparatus as claimed in claim 1, wherein the power cell cover further comprises an upper cover and a lower cover, with the operating interface module disposed therebetween.

7. The portable electronic apparatus as claimed in claim 6, wherein the operating interface module further comprises a circuit board, a key assembly and a display, the key assembly disposed on, and the display connected to, the circuit board.

8. The portable electronic apparatus as claimed in claim 7, wherein the key assembly further comprises a plurality of keys and the circuit board further comprises a plurality of key switches corresponding to the keys.

9. The portable electronic apparatus as claimed in claim 8, wherein the upper cover further comprises a plurality of key holes and a display port, the keys corresponding to the key holes and protruding therethrough, and the display corresponding to the display port and viewable therethrough.

10. The portable electronic apparatus as claimed in claim 7, wherein the display is connected to the circuit board via a flexible flat cable (FFC).

11. The portable electronic apparatus as claimed in claim 7, wherein the display is connected to the circuit board via a plurality of surface-mounted connectors.

* * * * *